United States Patent [19]
Godichon

[11] Patent Number: 5,207,561
[45] Date of Patent: May 4, 1993

[54] DEVICE FOR ASSEMBLING AN IMPELLER ON A DRIVING SHAFT

[75] Inventor: Alain Godichon, Saint-Remy, France

[73] Assignee: Abb Flakt AB, Stockholm, Sweden

[21] Appl. No.: 730,903

[22] PCT Filed: Feb. 7, 1989

[86] PCT No.: PCT/SE89/00048
§ 371 Date: Aug. 5, 1991
§ 102(e) Date: Aug. 5, 1991

[87] PCT Pub. No.: WO90/09522
PCT Pub. Date: Aug. 23, 1990

[51] Int. Cl.[5] ............... F04D 29/20; F04D 29/66
[52] U.S. Cl. ............... 416/134 R; 416/135; 416/500
[58] Field of Search ............... 416/134 R, 135, 140, 416/169 A, 500

[56] References Cited

U.S. PATENT DOCUMENTS

| | | | |
|---|---|---|---|
| 1,493,066 | 5/1924 | Caldwell et al. | |
| 1,973,573 | 9/1934 | Lougheed | 416/134 R |
| 2,041,507 | 5/1936 | Zeder | 416/134 R |
| 2,041,555 | 5/1936 | Lee | 416/134 R |
| 2,219,303 | 10/1940 | Fraser | |
| 3,893,555 | 7/1975 | Elmer | 416/134 R |
| 4,338,064 | 7/1982 | Carmel | |
| 4,566,855 | 1/1986 | Constabile et al. | 416/134 R |
| 4,826,404 | 5/1989 | Zwicky | 416/134 R |

Primary Examiner—Edward K. Look
Assistant Examiner—Michael S. Lee
Attorney, Agent, or Firm—Oblon, Spivak, McClelland, Maier & Neustadt

[57] ABSTRACT

An assembly or coupling arrangement for an impeller associated with a drive shaft. The impeller is supported by the drive shaft by a radial bearing having a small radial clearance. The bearing allows relative rotary motion between the impeller and shaft. In addition, an elastic or resilient element is mounted between the shaft and the impeller to transmit the torque from the shaft to the impeller while preventing or reducing transmission of torque pulsations.

4 Claims, 2 Drawing Sheets

DEVICE FOR ASSEMBLING AN IMPELLER ON A DRIVING SHAFT

BACKGROUND OF THE INVENTION

1. Technical Field

The present invention relates to a device for assembling or coupling an impeller upon a driving shaft.

2. Discussion of Background

The torque delivered by motors typically is not constant, but rather varies or pulses. The variation or pulsation of the torque is accentuated if a speed controller is incorporated into the driving system, for example in driving an impeller. Such driving systems can include, for example, electric motors having frequency converters or electronic variators, or diesel motors.

The pulsating torques often give rise to resonance vibrations in various parts of the machine. For example, the impeller blades may be subjected to resonance vibrations and such vibrations may result in premature fatigue failure in one or more parts of the machine. In the past, this problem has been solved by introducing an adapted elastic or resilient coupling between the driving shaft of the motor and the impeller shaft. Such an arrangement is shown in FIG. 1 in the environment of a fan. In this arrangement, an elastic coupling shown at 20 is provided between the driving shafts 21 of the motor 22 and the fan shaft 24 which supports the fan impeller 26. The fan shaft 24 is carried by separate bearings 28, 30. Although this solution protects the fan from pulsating torques of the motor, the arrangement is expensive and involves large space requirements. As a result, such an arrangement is unsuitable for a number of applications.

SUMMARY OF THE INVENTION

In view of the foregoing, it is an object of the present invention to provide a solution to the above problems which relating to pulsating torques. More particularly, in accordance with the present invention, pulsating torques may be accommodated by an improved coupling or assembly device which does not require unduly burdensome space and cost requirements.

In accordance with the present invention, pulsating torques are eliminated or reduced, with the construction also applicable to situations in which the impeller is directly supported by the driving shaft of the motor. Thus, the need for an elastic resilient coupling between separate driving and impeller shafts is eliminated. As a result, the construction is simpler and less expensive. Furthermore, the construction is compact, with the space requirements considerably reduced as compared with prior art solutions, which can be particularly important in certain fan applications. According to one aspect of the invention, the device is disposed within the hub of the impeller, thereby providing a particularly compact design.

BRIEF DESCRIPTION OF THE DRAWINGS

Other objects and advantages of the present invention will become readily apparent from the following detailed description, particularly when read in conjunction with the drawings in which.

DETAILED DESCRIPTION OF THE PREFERRED EMBODIMENTS

Figure 1:
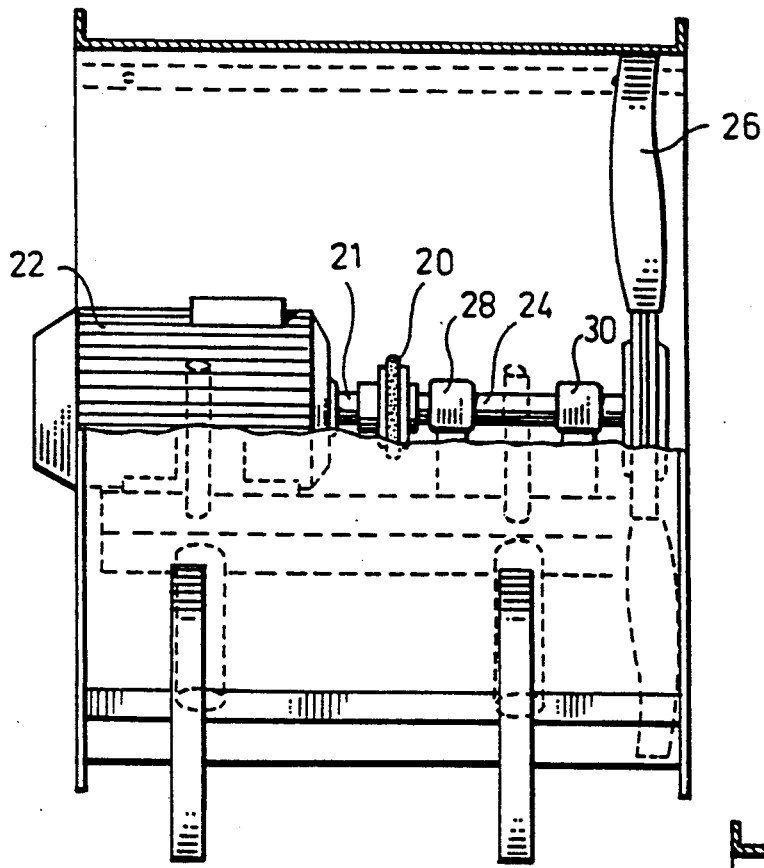
FIG. 1 is a side partial cross sectional view of a prior art device for protecting a fan against pulsating torques.
Figure 2:
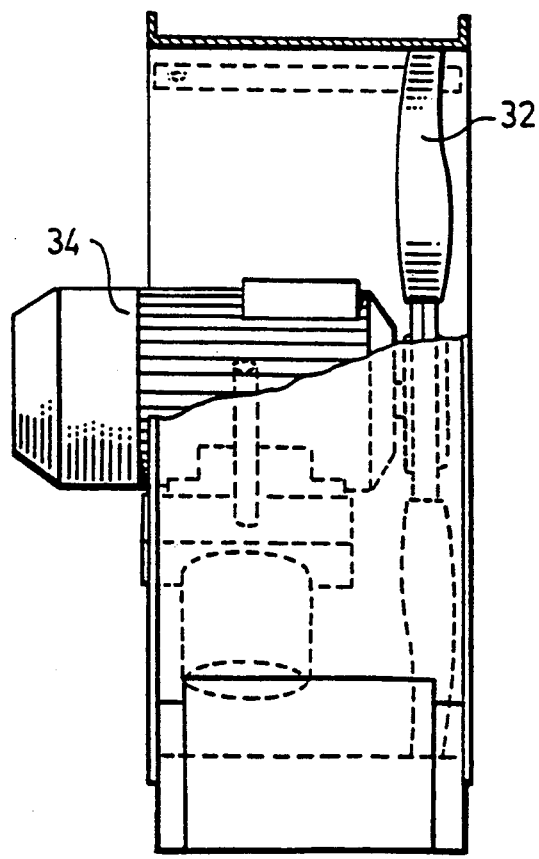
FIG. 2 illustrates a compact assembly of a drive motor and fan to which the present application is applicable.

FIG. 2 illustrates a compact assembly in which a fan impeller 32 is directly supported by the driving shaft of a motor 34. As is readily apparent, the arrangement of FIG. 2 is much more compact than that of FIG. 1 and, in accordance with the present invention, such a compact arrangement can be maintained while undesirable effects of torque pulsations are avoided.

Figure 3:
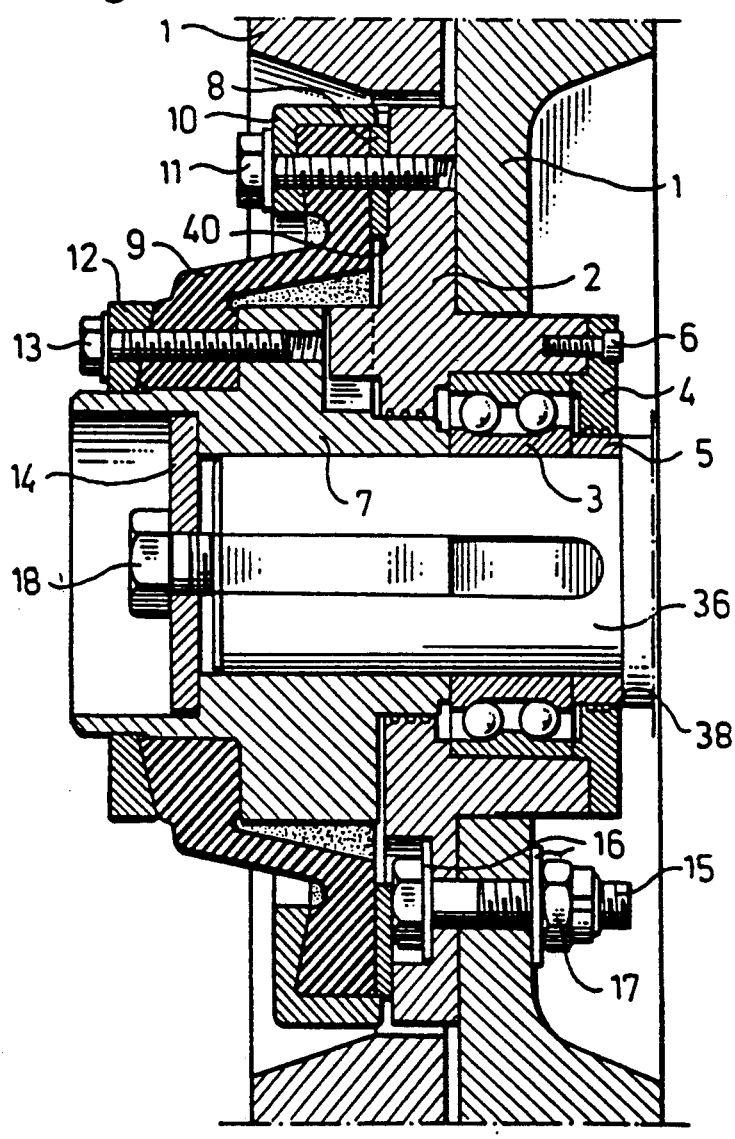
FIG. 3 is a cross section of a fan impeller hub in accordance with an embodiment of the present invention.

Referring now to FIG. 3, an embodiment of the assembly or coupling of the present invention is shown installed in an assembly of the type shown in FIG. 2. As will be readily apparent, the arrangement of the present invention provides for protection of the fan from pulsating torques from the drive motor by dampening and filtering the pulsations such that resonance frequencies are not imparted to the impeller or shaft. In FIG. 3, a fan impeller 1 is provided which is attached to an annular plate 2 by a bolted joint 15, 16, 17. A cover 4 is attached to the plate 2 as shown at 6. In addition, a cover 4 is provided for a ball bearing 3 which is fixed with respect to the axial direction of the driving shaft 36. Inside the cover 4, a distance ring is positioned between the bearing 3 and a shoulder 38 of the driving shaft 36.

Significantly, an elastic annular element 9 is also secured to the plate 2. This annular element 9 is clamped towards a centering ring 8 by screws 11 and clamp ring 10. The clamp ring 8 is fixed in a radial direction between the clamp ring 10 and a shoulder 40 on the plate 2. By virtue of the FIG. 3 arrangement, the torque is transmitted from elastic ring 9 to the plate 2 and through the contact surfaces of the centering ring 8 towards the elastic ring 9 and the plate 2.

The elastic ring 9 is also secured to the hub part 7 by a second clamp ring 12 and screws 13. The hub part 7 in turn is keyed onto the driving shaft 36, and further is screwed axially at 14, 18. This connection is designed such that the torque is transmitted from the driving shaft 36 to the elastic ring 9. The torque is transmitted substantially through the contact surfaces between the elastic ring 9 on one hand, and the hub part 7 and clamp ring 12 on the other.

As discussed above, a key (not shown) is utilized for the torque transmission between the shaft 36 and hub 7. The hub part 7 is screwed axially upon the driving shaft 36 by bolt 18 and washer 14. Thus, the bolt 18 and the entire hub construction in the arrangement of the present invention is tightened upon the driving shaft 36 towards the shoulder 38.

Torque from the driving shaft 36 is thus transmitted to the impeller 1 through the elastic ring 9. Pulsations or variation in the torque from the driving shaft 36 are thus dampened or filtered as a result of the function of the elastic ring 9 which absorbs the pulsations and variations by admitting or allowing a certain amount of rotary motion between the impeller 1 and the driving shaft 36 by the bearing 3 which centers the impeller 1 on the driving shaft 36 in the radial direction with a small clearance.

The elastic ring is preferably formed of rubber, and the bearing can be of any suitable type, such as a ball bearing, a roller bearing, a plain bearing or a bearing comprising a bushing in which the driving shaft can rotate.

Figure 4:
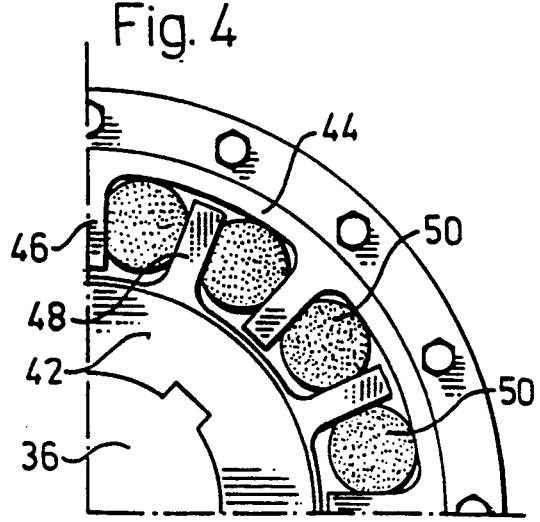
FIG. 4 illustrates an alternate embodiment of the present invention in which an elastic or resilient coupling is utilized.

Another embodiment of the present invention is shown in FIG. 4. In accordance with this arrangement, the elastic or resilient coupling between the driving shaft and the impeller includes a toothed wheel 42 disposed inside a surrounding cylinder 44. The surrounding cylinder 44 also includes inwardly directed teeth or projections 46. In the spaces between the adjacent teeth 46 of the cylinder 44 and the teeth 48 of wheel 42, pads 50 of an elastic material are provided. The pads may be formed, for example, of a rubber material. By attaching the driving shaft 36 to the toothed wheel 42 and the impeller 1 to the cylinder 44, an elastic coupling is realized which will dampen or filter pulsations and variations in the torque from the driving shaft 36.

It would also be possible to provide an elastic or resilient coupling between the driving shaft and the impeller by means of springs.

The device in accordance with the present invention is suitable for fans up to a certain size. For very large fans, the impeller can no longer be supported by the driving shaft from the motor due to the large size and weight. For such large impellers an arrangement of the type shown in FIG. 1 must be utilized.

Tests have been performed utilizing the device in accordance with the present invention installed on an axial fan with the fan impeller directly fitted on the end of the motor driving shaft. A drive system of 75 kW with a variable speed was utilized. With a rigid assembly upon the motor driving shaft, the first natural mode of vibration of the blades was excited to a high level by a pulsating torque. However, utilizing the assembly device of the present invention, the amplitude of the vibrations at the resonance speed was reduced by a factor of about 40.

Another advantage achieved in accordance with the present invention resides in the provision for a softer start of the fan which is particularly important in certain applications having undesirably large start-up torques.

Although the device in accordance with the present invention is described as particularly useful in a fan environment, such as axial as well as centrifugal types, it can also be utilized in other types of turbomachines.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for assembling an impeller on a driving shaft comprising:

bearing means for supporting an impeller on a driving shaft and for allowing relative rotary motion between said impeller and said driving shaft, said bearing means having a small radial clearance thereby limiting relative radial movement between said driving shaft and said impeller; and at least one resilient element mounted between said shaft and said impeller, wherein torque is transmitted from said driving shaft to said at least one resilient element such that torque pulsations are avoided while said bearing means provides a support between said impeller and shaft with substantially no torque transferred through said bearing means such that the bearing means and resilient element simultaneously control relative radial movement and transmission of torque pulsation between the driving shaft and impeller.

2. The device of claim 1, wherein said bearing means includes one of a roller bearing and a ball bearing.

3. The device of claim 2, further including a plate disposed between said bearing means and said impeller, and wherein said at least one resilient member is attached to said plate.

4. The device of claim 3, wherein said impeller is attached to said plate, and wherein said at least one resilient member is also attached to a hub part which is keyed to the driving shaft.

* * * * *